United States Patent [19]

Kirk et al.

[11] 4,435,292

[45] Mar. 6, 1984

[54] PORTABLE METHOD FOR DECONTAMINATING EARTH

[75] Inventors: James L. Kirk, Findlay, Ohio; Robert J. Ohneck, Lambertville, Mich.

[73] Assignee: KBI Corp., Findlay, Ohio

[21] Appl. No.: 315,345

[22] Filed: Oct. 26, 1981

Related U.S. Application Data

[63] Continuation of Ser. No. 115,992, Jan. 28, 1980, abandoned.

[51] Int. Cl.³ .................................................. C02F 1/74
[52] U.S. Cl. .................................... 210/747; 210/749; 210/758
[58] Field of Search .................... 166/266, 270, 275; 210/747, 749, 758

[56] References Cited

U.S. PATENT DOCUMENTS

| | | | |
|---|---|---|---|
| 546,126 | 9/1895 | Titus . | |
| 842,696 | 1/1907 | Pfeiffer, Jr. | 166/52 |
| 1,198,078 | 9/1916 | Squires . | |
| 1,286,666 | 12/1918 | Layne | 166/268 |
| 1,826,371 | 10/1931 | Spindler | 166/258 |
| 2,034,798 | 3/1936 | Clark | 166/52 |
| 2,115,379 | 4/1938 | Wolf | 166/52 |
| 2,230,001 | 1/1941 | McConnell et al. | 166/21 |
| 2,301,073 | 11/1942 | Newton et al. | 405/36 |
| 2,352,832 | 7/1944 | Gunderson | 166/268 |
| 2,548,059 | 4/1951 | Ramsey | 166/21 |
| 2,654,434 | 10/1953 | Culleton | 166/52 |
| 2,767,792 | 10/1956 | Spearow | 166/10 |
| 2,862,556 | 12/1958 | Tek | 166/10 |
| 2,875,831 | 3/1959 | Martin et al. | 166/9 |
| 2,875,833 | 3/1959 | Martin | 166/9 |
| 2,875,836 | 3/1959 | Stiff et al. | 210/9 X |
| 2,953,204 | 9/1960 | Doscher et al. | 166/266 |
| 3,057,404 | 10/1962 | Bergstrom | 166/52 |
| 3,193,009 | 7/1965 | Wallace et al. | 166/11 |
| 3,221,810 | 12/1965 | Marx | 166/10 |
| 3,251,412 | 5/1966 | Cooke et al. | 166/275 |
| 3,252,512 | 5/1966 | Baker et al. | 166/2 |
| 3,298,435 | 1/1967 | Schoenfeld et al. | 166/52 |
| 3,309,141 | 3/1967 | Fitch et al. | 299/5 |
| 3,330,348 | 7/1967 | Hardy et al. | 166/10 |
| 3,342,135 | 9/1967 | Schnabel, Jr. | 166/52 |
| 3,344,858 | 10/1967 | Gilchrist et al. | 166/9 |
| 3,369,601 | 2/1968 | Bond et al. | 166/9 |
| 3,425,555 | 2/1969 | Ridgeway | 210/170 |
| 3,547,190 | 12/1970 | Wilkerson | 55/194 |
| 3,628,607 | 12/1971 | Dietz | 166/305 |
| 3,649,533 | 3/1972 | Reijonen et al. | 210/170 |
| 3,684,011 | 8/1972 | Presley et al. | 166/270 |
| 3,754,598 | 8/1973 | Holloway, Jr. | 166/249 |
| 3,811,506 | 5/1974 | Carlin | 166/274 |
| 3,837,399 | 9/1974 | Allen et al. | 166/266 |
| 3,846,290 | 11/1974 | Raymond | 210/11 |
| 3,902,558 | 9/1975 | Watson, Jr. | 166/305 R |
| 3,956,145 | 5/1976 | Christopher et al. | 166/275 X |
| 4,071,278 | 1/1978 | Carpenter et al. | 299/5 |
| 4,133,383 | 1/1979 | Ely | 166/270 |
| 4,133,384 | 1/1979 | Allen et al. | 166/272 |

FOREIGN PATENT DOCUMENTS 52-52460  4/1977  Japan ................................ 210/747

*Primary Examiner*—Thomas G. Wyse
*Attorney, Agent, or Firm*—Hugh Adam Kirk

[57] ABSTRACT

Vertical and/or horizontal perforated pipes are embedded in the soil around an area of the earth which has been contaminated by a spill and these pipes are connected in a closed portable system with a pressure pump in series with an evacuator having a separator and scrubber. Thus some of the perforated pipes, preferably those surrounding the contaminated area, can have a flushing fluid forced into the soil below the area to flush out the contamination, and the other perforated pipes in and near the bottom of the contaminated soil in the area can be connected to the evacuators for sucking out the contaminated flushing fluid. The engine for driving the pump may be an internal combustion engine, an electric motor, or a hydraulic motor connected by pipes to a remote motor pump generator when noise and/or fire hazard is involved. The system maintains a positive pressure on the input perforated pipes and a negative pressure on the outlet perforated pipes. Valve means are used so that the direction of circulation of the flushing liquid may be reversed when and if desired. All of the apparati of this system are portable so that they can be set up at any location where a spill occurs.

At least part of the circulating flushing fluid is bypassed for removing the contamination therefrom before being reintroduced into the closed system. The removal of the contamination from the flushing fluid may be by aeration (if the contaminant is volatile and can be released into the atmosphere without contaminating it), reaction with chemicals, and/or adsorption with filters. Solvents also may be used in the flushing fluid. The flushing fluid also may be a gas, such as an inert gas like nitrogen.

17 Claims, 3 Drawing Figures

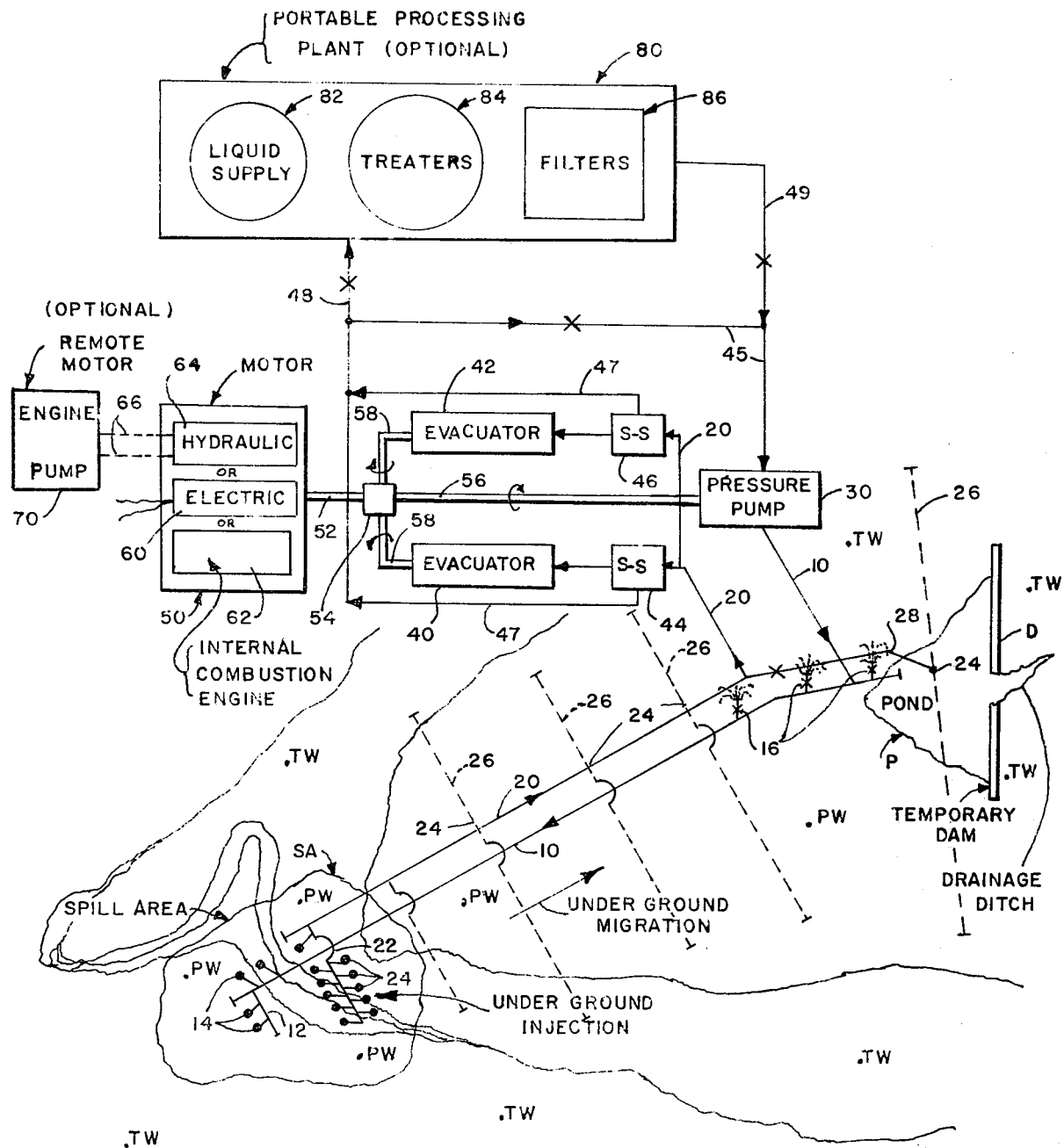
FIG.I

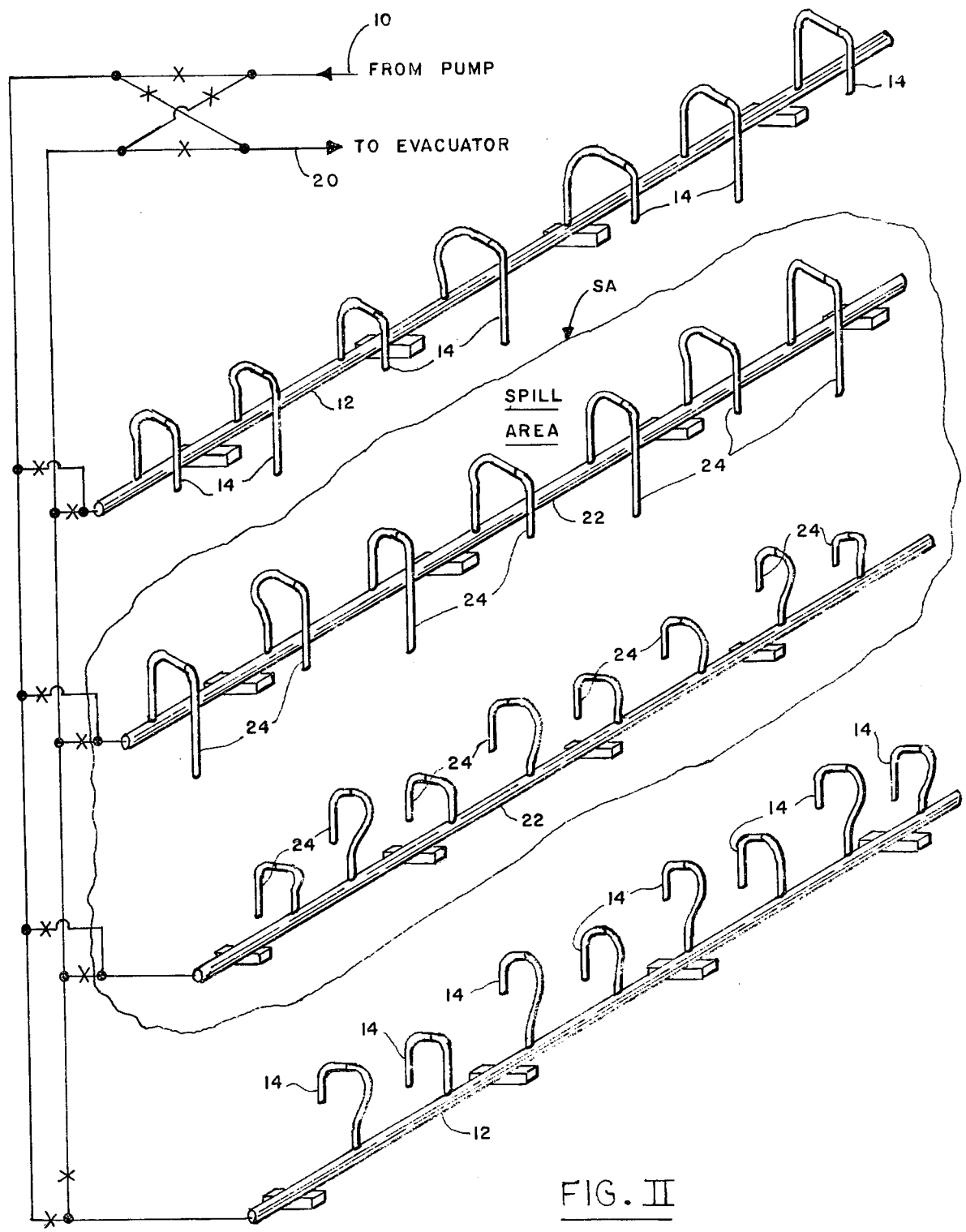
FIG. II

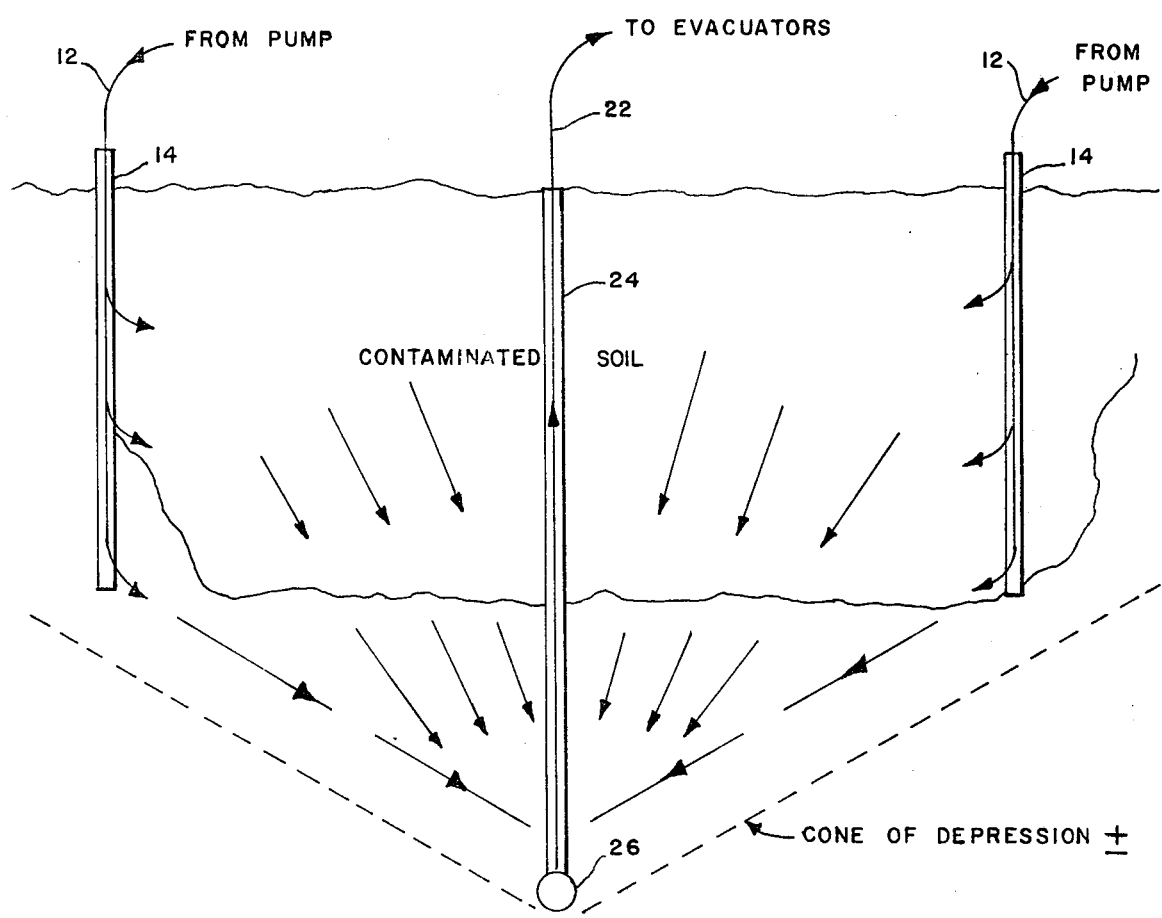
FIG. III

PORTABLE METHOD FOR DECONTAMINATING EARTH

This application is a continuation of application Ser. No. 06/115,992 filed Jan. 28, 1980 now abandoned.

BACKGROUND OF THE INVENTION

Although systems for decontaminating earth are known, such as shown in:

Ridgeway U.S. Pat. No. 3,425,555 issued Feb. 4, 1969 in Class 210/170

Dietz U.S. Pat. No. 3,628,607 issued Dec. 21, 1971 in Class 166/305 neither of these patents discloses a closed system involving pressurizing some of the perforated wells and simultaneously evacuating adjacent other perforated wells for increasing the transfer of the flushing liquid through the soil between the two perforated wells or pipes.

Apparatus and systems for pressurizing and sucking wells connected to manifolds are known as disclosed in:

Pfeiffer, Jr. U.S. Pat. No. 842,696 issued Jan. 29, 1907 in Class 166/52

Wolf U.S. Pat. No. 2,115,379 issued Apr. 26, 1938 in Class 166/52

Gunderson U.S. Pat. No. 2,352,832 issued July 4, 1944 in Class 166/268

Reijonen et al U.S. Pat. No. 3,649,533 issued Mar. 14, 1972 in Class 210/170.

Only the Wolf patent above discloses a closed system, but it relys on quickly changing the pressure and vacuum ducts for loosening the oil and does not employ a flushing fluid.

Suction wells with plural branch ducts are also well known as shown in the following U.S. patents:

Layne U.S. Pat. No. 1,286,666 issued Dec. 3, 1918 in Class 166/268

Newton et al U.S. Pat. No. 2,301,073 issued Nov. 3, 1942 in Class 405/36

Culleton U.S. Pat. No. 2,654,434 issued Oct. 6, 1953 in Class 166/52

Schnabel, Jr. U.S. Pat. No. 3,342,135 issued Sept. 19, 1967 in Class 166/52

Wilkerson U.S. Pat. No. 3,547,190 issued Dec. 15, 1970 in Class 55/194

However, none of these systems employ simultaneous pressurizing and evacuating adjacent walls or ducts.

Also, pressurized wells have been connected to manifold ducts as disclosed in:

Spindler U.S. Pat. No. 1,826,371 issued Oct. 6, 1931 in Class 166/258

Clark U.S. Pat. No. 2,034,798 issued Mar. 24, 1936 in Class 166/52

Bergstrom U.S. Pat. No. 3,057,404 issued Oct. 9, 1962 in Class 166/52

Schoenfeld et al U.S. Pat. No. 3,298,435 issued Jan. 17, 1967 in Class 166/52 but none of these references apply vacuum also to adjacent wells.

Although there are many other patents showing pressurized wells, none of these employ positive vacuum or evacuating means on adjacent wells thereto, not to mention a specific flushing fluid also.

Previously, areas which have been contaminated by spills have often had to be completely dug away and the removed earth placed in a location in which the contamination would not affect the surrounding ecology and/or inhabitants in accordance with the strict rules of the United States Government Environmental Protection Agency. Thus, not only is it important that the area that becomes contaminated from a spill be decontaminated, but that when it is decontaminated, that the material removed is stored or disposed of in a proper manner. Thus, the less flushing liquid which is used and has to be disposed of later, the more economical is the decontaminating system.

SUMMARY OF THE INVENTION

Generally speaking, the method and system of this invention comprises a portable system which can be installed at an area where a spill has occurred that has contaminated the ground. After the area of the contamination has been determined, perforated pipes and wells are inserted into this ground, some of which are pressurized and other of which are evacuated simultaneously so as to increase the transfer of the flushing fluid through the soil thereby accelerating the decontamination process and preventing migration of the contaminant into other areas. Since the system is a closed system, the contaminated liquid taken off in the evacuation side of the circulating system is bypassed in whole or in part to a portable processing plane wherein the contaminants are removed. This plant may comprise reservoirs such as top-of-the-ground plastic swimming pools in which the circulated flushing liquid is stored, treated and/or filtered and recirculated back into the system. If the contaminant is a volatile product and can be released into the atmosphere without further contamination, the pressure side of the system can be provided with a plurality of sprayers for spraying the circulating fluid to evaporate the volatiles therein and then catching the fluid in a pond or reservoir for further recirculation.

The perforated pipes which are placed in and around the spill area may comprise a pluralty of relatively close vertical wells connected to a manifold pressure duct adjacent to which are similar vertical wells or perforated pipes connected to the evacuation duct, and at the bottom of the seepage and/or migration area there may be placed or buried one or more perforated horizontal pipes also connected to the evacuation duct. The fact that the system is closed and is pressurized on one side and evacuated on the other, materially increases the transfer of the flushing fluid and the contaminant from the contaminated area into the decontamination system.

The spill areas usually occur as a result of an accidental dumping of hazardous chemicals on the ground from tank cars or tank trucks which have derailed, overturned, or otherwise been damaged to cause loss of their contents.

Another important feature of this invention is the fact it is so flexible both as to the ducts which can be pressurized and evacuated, and the valve means in these ducts for interchanging the connections to the perforated pipe as may be required.

Also there is flexibility for the driving motor for the pump and evacuators. This motor can either be an electric or an internal combustion engine, but if there is a possibility of a fire hazard or too much noise in the area where the spill occurs, the motor may be a hydraulic motor driven by a remote engine or motor and hydraulic pump connected by portable sections of pressurized pipe. The motor for the pump and evacuator can all be connected together and usually a plurality of evacuators are used for each pressure pump in order to get as much vacuum as possible and reduce the suction on the pressure side of the pump to improve its positive pressure output.

OBJECTS AND ADVANTAGES

Accordingly, it is an object of this invention to produce a simple, rapid, efficient, effective, economic, flexible and portable apparatus and system for decontaminating soils, ground and ground water which have become contaminated by spills.

Another object is to provide such an apparatus and system which is closed or self-contained and therefore reversible, which contains and confines the contaminant within a given area, and which employs less of the flushing or treating fluids for removing the contaminant, thus obviating the need to dispose of large volumes of contaminated material and/or undesirable chemicals.

BRIEF DESCRIPTION OF THE VIEWS

The above and other features, objects and advantages and manners of attaining them are described more specifically below by reference to embodiments of this invention shown in the accompanying drawings, wherein:

FIG. 1 is a topographic map of a contaminated area with a schematic diagram of an embodiment of a flushing fluid circulating system and processing plant according to this invention;

FIG. II is an enlarged perspective view of some manifold ducts for vertical perforated pipes in and around a spill area with their interconnections being shown schematically; and FIG. III is a schematic vertical sectional view through the earth of or soil below a contaminated area showing how vertical and/or horizontal perforated pipes or headers are used for flushing out the contaminated soil.

DETAILED DESCRIPTION OF PREFERRED EMBODIMENTS

The lower half of FIG. 1 shows contour lines of a topographic map of an area in which a spill has occurred, the highest terrains being toward the bottom of the map, with a spill area SA being outlined thereon at the lower left side of the map, and a reservoir or pond P with a temporary dam D being shown at the upper right of the map over which dam D drainage from the area may flow and be filtered or purified in a manner similar to that of applicant's assignee's copending application Ser. No. 06/115,991 filed Jan. 28, 1980 on even date herewith now U.S. Pat. No. 4,297,219 issued Oct. 27, 1981.

The determination of the spill area SA is made by placing test wells TW and sample-taking wells PW placed throughout the area whereby samples can be taken during the decontamination operation to determine when the decontamination has been completed. The location of these wells, of course, is determined by the type of soil, terrain, cone of depression, geology, strata, and so forth of the particular area.

Overlying the map there are shown in solid lines pressure and evacuating ducts 10 and 20, respectively, the former of which are connected to a manifold 12 and then to a plurality of vertical closely-placed perforated pipes or tubes 14 (see also FIGS. II and III), which perforated pipes are preferably placed around the periphery of the spill area SA and at the upper or higher drainage side or sides thereof, so that the flushing fluid forced under pressure through these pipes will be forced into the earth to flush out any contaminants that may have percolated therein.

An evacuating duct 20 is also shown in FIG. 1 connected to a manifold 22, which in turn is connected to a plurality of vertical closely-placed perforated tubes or pipes 24 (see also FIGS. II and III) located in the spill area SA, preferably at the lower seepage side or bottom of the cone of depression. Also the suction duct 20 may be connected to perforated headers 26 which may be buried or placed horizontally in the bottom of the contaminated area shown in FIG. III and connected to the lower end of one of the vertical pipes 24. Such horizontal headers 26 also may be placed under the migration area of the contaminants outside of the spill area SA as shown in dotted line headers 26 in FIG. I.

These perforated pipes 14, 24 and 26 may be provided with slits either at their lower ends or throughout their lengths, which perforations may or may not have screens, depending upon the amount of flushing fluid to be introduced and removed and the physical properties of the earth or soil in which they are embedded. Furthermore, the location of the pipes with respect to each other, also depends upon the porosity of the earth and the pressure needed and applied to the pipes. For example, the parallel vertical pipes 12 and 24 usually are from six to ten feet long and usually are placed not more than two or three feet apart in and around the contaminated area. The parallel horizontal header pipes 26, however, usually are spaced farther apart and are usually buried at the bottom of the cone of depression for the seepage of the contaminants and throughout the migration area. These horizontal pipes 26 may be easily laid in trenches that may be quickly dug and refilled by a backhoe or other similar earth-moving equipment.

The pressurized fluid duct 10 which is normally laid on top of the soil or earth from a portable pressure pump 30 directly connects with the pressurized manifold 12 and wells 14 and may also comprise a plurality of sprayers 16, each on separately valved ducts for aerating the fluid in the event the contaminants are sufficiently volatile to be dispersed by such aeration and their aeration would not unduly contaminate the surrounding atmosphere. The liquid thus sprayed from the sprayers 16 is then collected in a pond such as P, which also is confined in the area being decontaminated and has below it the suction headers 26 so as to insure that any contamination that may still remain in the liquid is prevented from seeping further from the area.

Similarly, the suction or evacuation ducts 20 also is normally laid on top of the soil or earth from the wells 24 and manifold 22 to portable evacuators 40, 42 through portable scrubbers 44 and 46, and may also have a valved branch 28 which may be inserted into the pond P for recirculating the liquid collected therein from the sprayers 16.

The evacuation duct 20 is connected to at least one and preferably two evacuators 40 and 42, in parallel, in order that as strong a vacuum as possible can be placed upon the duct 20. Between these evacuators and the ducts 20, there is provided for each evacuator a separator-scrubber 44 and 46, respectively, which separates the liquids from the gases produced by the suction or vacuum, so that the liquid can easily be fed into the suction side of the pump 30 via the ducts 45 and 47, and/or introduced through bypass ducts 48 to the portable processing plant 80 for the removal of the contaminant from the liquid or flushing fluid before it is returned via duct 49 to the suction side of the pump 30 together with the separated liquid from the separators 44 and 46.

The common portable driving motor assembly 50 may be connected to the evacuators 40 and 42 and pressure pump 30 directly through shafts and gearing 52, 54 and 56 and 58, so that a single motor can be used for driving all of these units for the circulation of the flushing fluid through the closed system of this invention. This motor 50, however, may take several different forms. It may be an electric motor, such as 60, or it may be an internal combustion engine, such as 62, either gas or diesel, or it may be a hydraulic motor such as 64 with portable to and from pressure conduits 66 connecting it to a remote engine or motor 70 which may be either an electric motor as 60 or an internal combustion engine as 62. The reason for the remote motor 70 is that if the contamination is a flammable material and there is a possibility of a fire hazard, it is important that no sparks from an electric motor, or heat from the exhaust of an internal combustion engine be adjacent the spill area SA. Furthermore, if the spill area is in a populated area where noise is a factor, then it is important that the noise of the portable driving internal combustion engine 62 be also remote from the spill area SA.

All of the motor, pump, and separator units, as well as the ducts and wells are portable so that they can easily and quickly be transported and set up at a contaminated area regardless of the location of this area.

Since the system of this invention includes a flushing fluid which may be either liquid or gaseous, but usually is a liquid, a portable processing plant 80 for the regeneration of this fluid may be located adjacent the spill site. Thus, all or a portion of the liquid from the separators 44 and 46 may be purified before being returned to the closed system through duct 49. This portable processing plant 80 usually comprises a plurality of portable reservoirs, such as above-ground plastic swimming pools. One reservoir 82 may be for the supply and make-up of the flushing liquid, another one or more reservoirs 84 for chemically treating the contaminated liquid, and this system 80 also may include a portable filtering apparatus 86 for the removal of contaminants by adsorption. By maintaining a limited volume of the flushing fluid, and recirculating it through the contaminated soil in and below a contaminated area, contamination of a greater area is avoided as well as the problem of the disposal of a large volume of contaminated fluid. Of course, the type of treating and filtering depends upon the physical and chemical properties of contaminant in the spill area. Furthermore, the flushing fluid may include a solvent for absorbing the contaminant. If the flushing fluid is a gas, it usually is an inert gas such as nitrogen, however a reactive gas which would react with the contaminant to form an inert or harmless chemical may also be used in this closed system.

A further advantage of the system of this invention is disclosed in FIG. II in the schematic valved duct connections to the manifolds 12 and 22 in that any one of the manifolds can be changed from a pressurized manifold to an evacuating manifold and vice versa, as may be desired or required, and even alternately. Thus, all the wells 12 and 14 may be pressurized for a while and then all may be evacuated for a while, depending on the type of flushing fluid and contaminants and soil involved, such as for example when the flushing fluid is a solvent which would react with a contaminant in a soil whiich is not sufficiently porous so that transfer easily to a relatively close evacuating well or duct.

It has been found that by employing such a closed system with as high a vacuum as possible on the outlet side, together with simultaneously as high a pressure as possible on the pressure side, that rapid, thorough and complete decontamination of soil can be obtained in a relatively short time, i.e. many times faster than could be obtained by the natural seepage of fluid through the soil, or even pressurization alone, or evacuation alone. Thus the contaminant is also prevented from migration and seepage for the further contamination of a larger area.

While there is described above the principles of this invention in connection with specific apparatus, it is to be clearly understood that this description is made only by way of example and not as a limitation to the scope of this invention.

We claim:

1. A method for decontaminating the soil below an area of earth which has been contaminated by a spill by means of a flexible portable reversible closed fluid circulating system, comprising the steps of:
   (A) testing the area for determining the boundaries of the contamination,
   (B) inserting a plurality of relatively closely spaced perforated pipes around and into said soil below said area,
   (C) circulating a flushing fluid under positive pressure into said pipes around the determined contaminated area,
   (D) simultaneously under negative pressure removing said circulating flushing fluid which contains contaminants from said pipe in said determined contaminated area,
   (E) from at least a portion of the removed circulating fluid which contains contaminants, and
   (F) injecting the decontaminated flushing fluid back into said soil under said positive pressure to maintain said closed fluid circulating system.

2. A method according to claim 1 wherein said soil has a varying porosity.

3. A method according to claim 1 wherein said soil includes an underground water table.

4. A method according to claim 1 wherein said area of earth is contaminated by migration from a spill area.

5. A method according to claim 1 wherein said pipes include perforated vertical pipes.

6. A method according to claim 1 wherein said pipes include horizontal perforated pipes inserted in said area.

7. A method according to claim 1 wherein said circulating flushing fluid increases the transfer rate through said soil from said pipes under positive pressure to said pipes under negative pressure removing the contamination from said soil.

8. A method according to claim 1 wherein said removing of contaminants includes aeration of said bypassed fluid portion.

9. A method according to claim 1 wherin said removing of contaminants includes filtering of said bypassed fluid portion.

10. A method according to claim 1 wherein said removing of contaminants includes chemically treating of said bypassed fluid portion.

11. A method according to claim 10 wherein said chemically treating comprise neutralizing.

12. A method according to claim 1 including circulating said flushing fluid by a second circulating hydraulic liquid pressurized at a remote location.

13. A method according to claim 1 including periodically alternating the direction of circulation of said flushing fluid through said contaminated area.

14. A method according to claim 1 wherein said flushing fluid is a liquid.

15. A method according to claim 14 wherein said flushing liquid comprises water.

16. A method according to claim 1 wherein said flushing fluid is a gas.

17. A method according to claim 1 including replenishing uncontaminated circulating flushing fluid under said positive pressure into said soil.

* * * * *

UNITED STATES PATENT AND TRADEMARK OFFICE
CERTIFICATE OF CORRECTION

PATENT NO. : 4,435,292

DATED : March 6, 1984

INVENTOR(S) : James L. Kirk et al

It is certified that error appears in the above–identified patent and that said Letters Patent are hereby corrected as shown below:

Column 1, line 48, change "walls" to - - wells - - .

Column 2, line 25, change "plane" to - - plant - - .

Column 3, line 36, cancel "of".

Column 6, line 38, after "(E)" insert - - removing the contaminants - - .

Signed and Sealed this

Fourth Day of September 1984

[SEAL]

Attest:

Attesting Officer

GERALD J. MOSSINGHOFF

Commissioner of Patents and Trademarks